(No Model.)
J. JOHNSON.
THILL COUPLING.
No. 547,722. Patented Oct. 8, 1895.
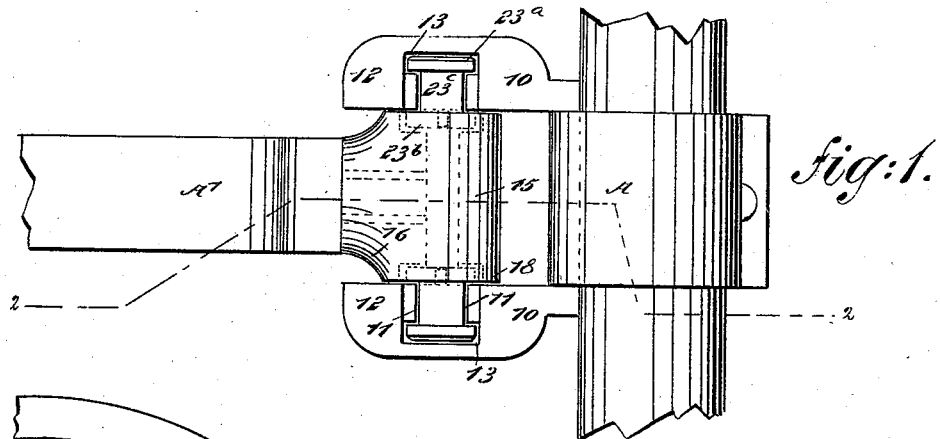
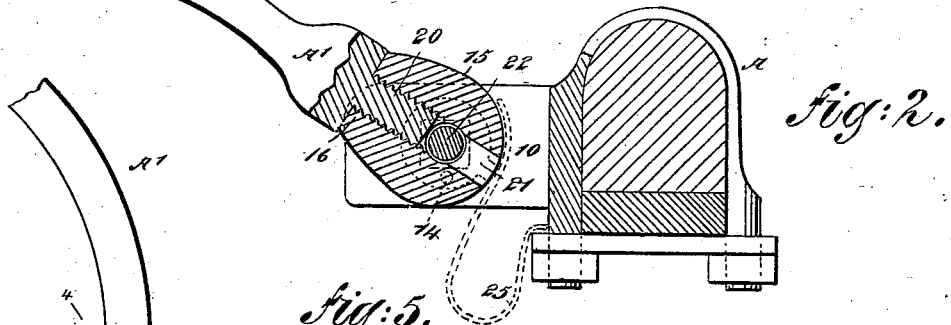
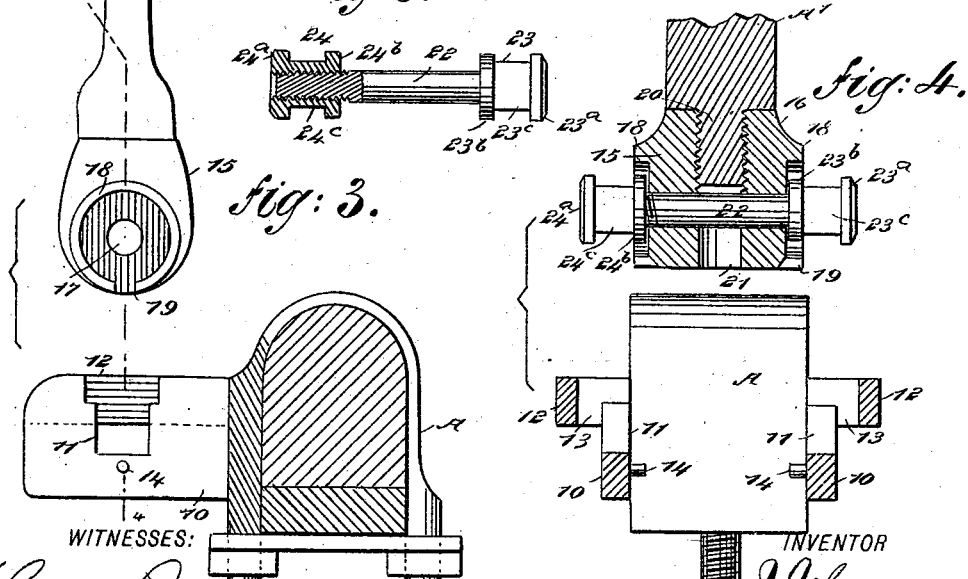
WITNESSES:
INVENTOR
J. Johnson
BY
Munn & Co
ATTORNEYS.

UNITED STATES PATENT OFFICE.

JOEL JOHNSON, OF SUNNY SIDE, ARKANSAS.

THILL-COUPLING.

SPECIFICATION forming part of Letters Patent No. 547,722, dated October 8, 1895.

Application filed February 28, 1895. Serial No. 540,060. (No model.)

*To all whom it may concern:*

Be it known that I, JOEL JOHNSON, of Sunny Side, in the county of Chicot and State of Arkansas, have invented a new and Improved Buggy-Shaft and Pole-Coupling, of which the following is a full, clear, and exact description.

My invention relates to an improvement in vehicle-shafts and pole-couplings, especially couplings for buggy-shafts; and the object of this invention is to provide a coupling which will permit of the shaft or pole being disconnected from the axle in an expeditious and convenient manner, and whereby when such a disconnection is made the knuckle carried by the thill-iron and parts connected therewith will be held in the position that they occupied when coupled to the axle, thus providing a means for setting the coupling in a manner to be coupled quickly with the receiving members of the axle, and whereby when the coupling is so set it need not be again disturbed when used in connection with the same vehicle.

Another object of the invention is to provide a means whereby, should the especial form of coupling not be required in the attachment of the thills to another vehicle, the said coupling may be removed from connection with the thills and the thills fitted to the receiving-sections of the ordinary thill-coupling.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the improved shaft and pole-coupling connected with the clip arms or ears of a vehicle-axle. Fig. 2 is a section taken longitudinally on the line 2 2 of Fig. 1. Fig. 3 is a side elevation of a thill-iron and knuckles attached thereto and a section through the clip, showing one of the ears or arms thereof, the thill-iron having been disconnected from the clip. Fig. 4 is a section taken substantially on the line 4 4 of Fig. 3, and Fig. 5 is a detail view of the coupling-bolt.

In carrying out the invention the clip-section of the coupling consists of a clip A, secured upon the axle in the usual manner and provided at each side preferably with a forwardly-extending horizontal arm or ear 10. In each arm or ear a vertically-located polygonal or rectangular opening 11 is made, as shown in Fig. 1, which is wider at the top than at the bottom, and this opening is produced in an ear or arm at or about a central point between the clip and the outer extremity of the arm. A strap 12 is made to span the upper enlarged portion of each opening 11, the strap being located upon the outer face of the arm or ear in which the opening is made. The strap is provided with a recess or vertical opening 13, which will register with the upper or enlarged portion of the opening 11 that it spans, thus making the opening 11 considerably larger at the top, both longitudinally and transversely of the ear or arm, than at its lower portion.

The construction of the clip-section of the coupling is completed by locating a key 14 below the opening 11 upon the inner face of each arm or ear 10, the said key being in the nature of a horizontal pin, and it is placed below the central portion of the aforesaid opening 11, as is shown in Fig. 3.

In the formation of the coupling-section of the coupler the thill-iron A' is attached to a knuckle 15. This knuckle is somewhat cylindrical in exterior contour, and is preferably made thicker at what may be termed the "central portion" of its front side, the enlargement being indicated by the reference-numeral 16. A bolt-opening 17 is made longitudinally through the center of the knuckle, extending from end to end, and each end portion of the knuckle is provided with a recess, the wall of which is concentric with the bolt-opening 17, forming thereby an annular flange 18 at each end of the knuckle, and in the central portion of the back of the knuckle an opening 19 is made in each flange, the two openings being in longitudinal alignment.

The inner end of the thill-iron A' is provided with a reduced and exteriorly-threaded bolt-section 20, which is screwed into a correspondingly threaded opening 21, extending diametrically through the knuckle from the central portion of its front to the corresponding portion of its back, as shown in Fig. 4, and, if desired, the said opening 21 may stop where it intersects the bolt-opening 17. Thus it will be observed that this knuckle may be adapted to any vehicle-thill.

The coupling-bolt 22 is shown in detail in Fig. 5, and the said bolt is provided with a button-head 23 at one end, the opposite end being simply threaded. This button-head comprises a head proper 23$^a$, the head being shaped correspondingly to the shape of the lower portion of the opening 11 in the ear or arm of the clip-section of the coupling, and between the button or collar 23$^b$, which is formed on the bolt back of the head, the intervening surface 23$^c$ is rendered of the same shape as the head and is of much greater diameter than the body of the bolt, but of less size than the head. The button or collar 23$^b$ is so placed with relation to the head that when a coupling is to be made the head proper of the bolt may pass downward into the opening or recess made in the strap 12 of the said ear, the button or collar 23$^b$ being practically in engagement with the inner face of the ear or arm 10, while the rectangular enlarged portion 23$^c$ between the head and collar will neatly fit into the narrower or lower portion of the opening 11 in said arm, as is clearly shown in Fig. 1. The threaded end of the bolt is adapted to receive a button-headed nut 24, correspondingly formed to the head-section of the bolt, comprising an outer or head section 24$^a$, an inner button or collar section 24$^b$, and an intervening polygonal section 24$^c$. The buttons or collars 23$^b$ and 24$^b$ are of less diameter than the diameter of the space at the ends of the knuckle within its flanges 18, as shown in Fig. 4. The coupling-bolt is passed through the longitudinal or bolt opening 17 in the knuckle of the thill-iron until the collar or button section of its head will be within the flange at one end of the knuckle. The button-headed nut 24 is then screwed upon the opposite end of the bolt until the knuckle at its ends is practically clamped between the two button or collar sections 23$^b$ and 24$^b$. Thus it will be observed that the thills may be removed from connection with the clip-section of the coupling without the least danger of the coupling-bolt becoming lost or being loosened.

In effecting a coupling the thills are brought to the vertical position shown in Fig. 3, and the button-head of the bolt and its button-headed nut 24 will readily enter the ears or arms of the clip provided to receive them, and the keys 14 of the clip-section will pass through the openings 19 in the flange, so that when the thills are carried downward to a working position, or a position approximating such, the keys will be between the flanges 18 and the button or collar sections of the bolt and nut. The thills turn loosely on the bolt, but the bolt is held from turning by means of the formation of the sockets receiving its outer extremities; and it is evident that since the keys are within the flanges of the thill-knuckle when the thills are in operative position they cannot by any possibility at that time be lifted or separated from the thill-sections with which they may be connected. It is further evident that should the thills be needed in connection with a vehicle not provided with the improved coupling the coupling-bolt 22 need only be removed and the ordinary coupling-bolt introduced in its stead. Any form of antirattler may be employed, that shown in the drawings being a spring 25, which has bearing upon the clip and is carried upward to a bearing likewise on the back or rear portion of the knuckle. Owing to the peculiar locking connection between the coupling-bolt and the arms of the clip-section of the coupling, the said arms when the bolt is in engagement therewith will be effectually prevented from spreading apart.

Having thus described my invention, I claim as new and desire to secure by Letters Patent—

1. In a buggy shaft and pole coupling, the combination with a clip section provided with parallel arms or ears, each having a recess formed therein, and a key located upon the inner face of each arm, of a thill iron having an annular flange at each side, each flange having an opening in its circumference, the thill iron being provided with a bolt extending through the thill iron and having its ends projected outward beyond the sides of the thill and shaped correspondingly to the recesses in the arms of the clip, the ends of the bolt being adapted to enter the said recesses, substantially as described.

2. In a buggy shaft and pole coupling, the combination with a clip having arms forwardly projected therefrom, each of the said arms being provided with a polygonal recess, and a strap spanning each recess at its outer side, the said strap being carried out from the said recess forming a space between it and the outer wall of the clip arm, and a key located upon the inner face of each arm below the said recess, of a thill iron provided with an annular flange at each side, each flange having an opening in its circumference, a coupling bolt loosely mounted in said thill iron and having its ends projected beyond the sides of the iron, the ends being enlarged and shaped to enter the recesses in the arms of the clip, the bolt being provided with a head at each end to enter the space between the straps of the said clip arms and their outer faces, substantially as described.

3. In a thill or pole coupling, the combination, with a clip having arms forwardly projected therefrom, each arm being provided with a vertical polygonal recess of greater width at the top than at the bottom, and a strap spanning the outer portion of each recess at the top, a space intervening the said strap and outer wall of the arm to which it is attached, of a thill iron, a coupling bolt loosely passed through the said thill iron and provided with a button-head at one end, the opposite end being threaded, and a button-headed nut screwed upon the threaded end of the bolt, the said button head and nut being each provided with a head proper at the outer end, a collar and an intervening portion between the head and collar, as and for the purpose specified.

4. The combination, with a clip having arms projecting forwardly therefrom, each arm being provided with a polygonal vertically located opening larger at the top than at the bottom, a strap spanning the upper portion of each opening, the said strap being located upon the outer face of each arm, a space being made to intervene the said strap and said outer face opposite the opening spanned by the strap, and a key located upon the inner face of each arm below the vertical opening therein, of a thill iron provided with an annular flange at each side, each flange having an opening at one point in its circumference, a bolt loosely passed through the flanged portion of the thill iron and provided with a button head, the surface between the head and button being polygonal and fitted to enter the polygonal opening in the clip arm, the head being adapted to enter the space between the said opening and the strap spanning it, and a button-headed nut adapted to be screwed upon the said bolt, the nut corresponding in shape to the head of the bolt, as and for the purpose specified.

5. In a thill coupling, a knuckle having an opening therein adapted to receive the rear end of a thill iron and a bolt opening extending through the knuckle, the said knuckle being provided with an annular flange at each side and each flange having an opening at one point of its circumference, substantially as described.

6. In a thill coupling, a bolt having a button head at one end comprising a head proper, a collar and an intervening portion between the head and collar of greater diameter than the body of the bolt, the bolt being provided with a button headed nut at its other end correspondingly formed to the head portion of the bolt, substantially as specified.

JOEL JOHNSON.

Witnesses:
  R. M. GRIMES,
  JOHN C. CONNERLY.